(12) United States Patent
Xiao et al.

(10) Patent No.: US 10,064,518 B2
(45) Date of Patent: Sep. 4, 2018

(54) AIR GUIDE MEMBER IN AN AIR-BASED FRYER

(71) Applicant: KONINKLIJKE PHILIPS N.V., Eindhoven (NL)

(72) Inventors: Weimin Xiao, Eindhoven (NL); Xinzhong Lai, Eindhoven (NL); Yanling Gao, Eindhoven (NL); Ning Zhou, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 15 days.

(21) Appl. No.: 15/039,153

(22) PCT Filed: Dec. 8, 2014

(86) PCT No.: PCT/EP2014/076803
§ 371 (c)(1),
(2) Date: May 25, 2016

(87) PCT Pub. No.: WO2015/086477
PCT Pub. Date: Jun. 18, 2015

(65) Prior Publication Data
US 2016/0360922 A1    Dec. 15, 2016

(30) Foreign Application Priority Data

Dec. 13, 2013  (CN) ................. PCT/CN2013/089408
Feb. 24, 2014  (EP) ...................................... 14156289

(51) Int. Cl.
*F24C 15/32*  (2006.01)
*A21B 1/24*  (2006.01)
*A47J 36/38*  (2006.01)
*A47J 39/00*  (2006.01)
*A47J 37/00*  (2006.01)
*A47J 37/06*  (2006.01)

(52) U.S. Cl.
CPC ................. *A47J 36/38* (2013.01); *A21B 1/24* (2013.01); *A47J 37/00* (2013.01); *A47J 37/0641* (2013.01); *A47J 39/003* (2013.01); *F24C 15/322* (2013.01)

(58) Field of Classification Search
CPC .... F24C 15/322; F24C 15/325; F24C 15/327; A21B 1/26; A21B 1/24
USPC .......... 99/476, 474; 219/681, 400; 126/21 A
See application file for complete search history.

(56) References Cited

U.S. PATENT DOCUMENTS 3,820,525 A * 6/1974 Pond ........................ A21B 2/00
                                                    126/21 A
4,068,572 A * 1/1978 Vogt ..................... A47J 37/047
                                                    219/400

(Continued)

FOREIGN PATENT DOCUMENTS

EP    1867264 A1    12/2007
GB    1235865 A     6/1971
(Continued)

*Primary Examiner* — Reginald L Alexander (57) ABSTRACT

An air guide member, for an apparatus for preparing food by circulation of hot air in a food preparation chamber, includes an air deflecting structure and a protected region for collecting residual material from the food preparation chamber. The air deflecting structure has a deflection surface with a deflection orientation that leads away from the protected region.

14 Claims, 12 Drawing Sheets

(56) References Cited

U.S. PATENT DOCUMENTS

| | | | |
|---|---|---|---|
| RE31,765 E * | 12/1984 | Guibert | A23L 3/365 |
| | | | 126/21 A |
| 6,747,250 B1 | 6/2004 | Cha | |
| 8,011,293 B2 * | 9/2011 | McFadden | A21B 1/245 |
| | | | 126/21 A |
| 8,042,458 B2 * | 10/2011 | Ueda | A21B 3/04 |
| | | | 126/21 A |
| 8,106,334 B2 * | 1/2012 | Nam | F24C 15/322 |
| | | | 126/21 A |
| 2009/0134140 A1 | 5/2009 | Van Der Weij | |
| 2013/0175253 A1 | 7/2013 | Shei | |
| 2016/0360922 A1 | 12/2016 | Xiao | |

FOREIGN PATENT DOCUMENTS

| | | |
|---|---|---|
| GB | 2482331 A | 2/2012 |
| JP | 2003194345 A | 7/2003 |
| JP | 2012122678 A | 6/2012 |
| WO | 8002363 A1 | 11/1980 |
| WO | 9423627 A2 | 10/1994 |
| WO | 2007144432 A1 | 12/2007 |
| WO | 2010034338 A1 | 4/2010 |

* cited by examiner

AIR GUIDE MEMBER IN AN AIR-BASED FRYER

This application is the U.S. National Phase application under 35 U.S.C. § 371 of International Application No. PCT/EP2014/076803, filed on Dec. 8, 2014, which claims the benefit of International Application No. PCT/CN2013/089408 filed on Dec. 13, 2013 and International Application No. 14156289.2 filed on Feb. 24, 2014. These applications are hereby incorporated by reference herein.

FIELD OF THE INVENTION

The present invention relates to an air guide member for an apparatus for preparing food by circulation of hot air, and to an apparatus for preparing food implementing this air guide member.

BACKGROUND OF THE INVENTION

Air-based fryers are known for cooking food, for example fries or chicken, wherein the heat for preparing the food is provided by hot air. To heat the food for the preparation and cooking purpose, a stream of hot air, or flow of hot air, is generated to pass the food placed in a food preparation chamber. This type of appliances can be used in the household environment. However, with such appliances, it sometimes happens that fumes are generated during the cooking procedure, which fumes are required to be kept at a minimum for considering hygiene, odors and safety issues. A reduction of fumes can be achieved, for example, by reducing the temperature of the hot air circulating. However, in some food preparation procedures, the food preparation still requires a higher temperature, for example 160° C.

SUMMARY OF THE INVENTION

It is an object of the invention to propose an improved air guide member for an apparatus for preparing food by circulation of hot air in a food preparation chamber.

The object of the present invention is solved by the subject-matter of the independent claims, wherein further embodiments are incorporated in the dependent claims.

The air guide member according to the invention comprises an air deflecting structure, a protected region for collecting residual material from the food preparation chamber, wherein the air deflecting structure has a deflection surface with a deflection orientation that leads away from the protected region.

This new air guide member provides a novel hot air flow pattern in order to reduce the temperature of a region in a air-based fryer or oven, in which residual material (e.g. cooking oil, melted fat . . . ) are deposited. Since cooking oil fumes are usually generated by getting in contact with elements having high temperatures, the present invention thus prevents or reduces the generation of those cooking oil fumes.

More specifically, by guiding hot air away from the protected region, the protected region is kept at a relative lower temperature. As a consequence, residual material, in particular oils and particles which naturally fall from food ingredients being cooked, are collected in this protected region having a temperature low enough to prevent generation of smokes when reaching this protected region.

In a preferred embodiment, the air deflecting structure at least partly surrounds the protected region.

This implementation is advantageous to focus hot air on a common region, in order to increase cooking efficiency.

In a preferred embodiment, the air deflecting structure circumferentially surrounds the protected region This implementation is advantageous in case the food preparation chamber is circular.

In a preferred embodiment, the protected region forms an unobstructed opening.

This implementation allows using the bottom part of the apparatus on which the air guide member is placed, as a collection surface to collect the residual material, resulting in a convenient and cost-effective solution.

In a preferred embodiment, the protected region comprises a bottom surface (88) to close a bottom opening of the protected region.

This implementation allows to conveniently collect the residual material in the air guide member itself.

In a preferred embodiment, the bottom surface is positioned in between a lower edge level of the air deflecting structure, and an upper edge level of the air deflecting structure.

Varying the position of the bottom surface allows varying the temperature of the bottom surface, as a lower temperature of the bottom surface is obtained if distance from the upper edge level is increased. This feature thus ensures that fumes will not be generated by residual material falling on this bottom surface.

In a preferred embodiment, the bottom surface is positioned below a lower edge level of the air deflecting structure.

Varying the position of the bottom surface allows varying the temperature of the bottom surface, as a lower temperature of the bottom surface is obtained if distance from the lower edge level is increased. This feature thus ensures that fumes will not be generated by residual material falling on this bottom surface.

In a preferred embodiment, the deflection surface has an inclination angle—in the range [0°; 60° ] in flow direction compared to a horizontal surface taken as a reference.

This range of value for the inclination angle allows leading the flow of hot air away from the protected region, and thus keep this protected region at a lower temperature.

In a preferred embodiment, the air deflecting structure comprises a peripheral portion forming a concave structure.

This allows reducing air turbulences at the entrance of the air guide member, and ensuring a smooth air flow circulation in the food preparation chamber.

In a preferred embodiment, the air guide member further comprises a thermal insulation element to limit conductive heat transfer to the protected region.

This allows limiting heat conduction from the structure of the air guide member to the protected region, and thus guaranties that temperature of the protected region is kept at a lower temperature.

In a preferred embodiment, the thermal insulation element is made of silicone.

The use of silicone gel is a cost-effective solution to limit heat conduction.

The invention also applies to an apparatus comprising a system for generating a flow of hot air, a food preparation chamber having a bottom part with a plurality of openings, an air guide member according to the invention, placed below said bottom part, air guide means to guide the flow of hot air towards said air guide member.

This apparatus allows preparing food by circulation of hot air. The air guide member according to the invention allows directing the flow of hot air directly towards the bottom plate of the food preparation chamber, above the protected region. The residual material falling in this lower temperature protected region will thus not generate cooking oil fumes.

In a preferred embodiment, the plurality of openings defines an area having a width smaller than the width of the protected region.

This ensures that all residual material will fall into the protected area.

In a preferred embodiment, the air guide member is freely detachable from the apparatus.

Having a detachable air guide member is convenient for cleaning purposes. Moreover, a detachable air guide member can conveniently be offered as accessory to consumers.

In a preferred embodiment, the apparatus comprises walls enclosing the food preparation chamber, a concave peripheral portion at the bottom part of walls, where the concave peripheral portion is abutting the deflection surface of the air guide member.

This arrangement is advantageous to reduce air turbulences at the entrance of the air guide member.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
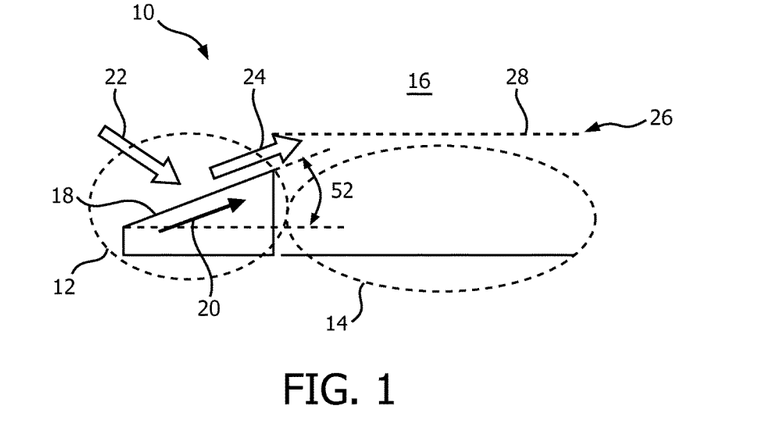
FIG. 1 illustrates a cross-section of an air guide member according to the invention.

FIG. 1 illustrates an air guide member 10 for an apparatus for preparing food by circulation of hot air. The air guide member 10 comprises an air deflecting structure 12 and a protected region 14. The protected region 14 is configured for a collection of residual material from a food preparation chamber that can be arranged in an area 16 above the protected region 14. The air deflecting structure 12 is made from a heat resistant material, such as, for example, aluminium or stainless steel. Preferably, the air deflecting structure 12 is made from low thermal conductivity material.

The air deflecting structure 12 has a deflection surface 18 with a deflection orientation, illustrated with an arrow 20, that leads away from the protected region 14 for guiding an air flow 22 which approaches in direction of the protected region 14, but the air flow is guided away from the protected region 14 such that the protected region 14 is arranged outside a resulting main air flow, indicated with further arrow 24. The deflection orientation 20 leads to an area 26 above the protected region 14, in which area 26 an air permeable bottom surface 28 of a food preparation chamber can be arranged.

Advantageously, the deflection surface 18 has an inclination angle 52 in the range [0°; 60°] in flow direction, compared to a horizontal surface taken as a reference (such as the main horizontal plane of the protected region 14).

Advantageously, the air deflecting structure 12 at least partly surrounds the protected region 14.

Figure 2A:
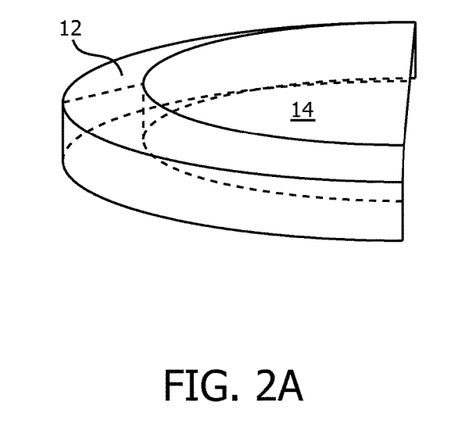
FIG. 2A shows a perspective view of a first example of an air guide member according to the invention.
Figure 2B:
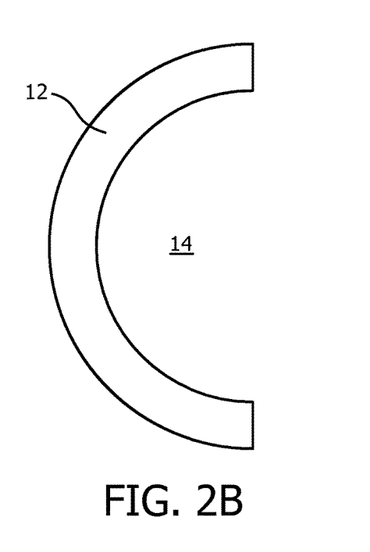
FIG. 2B shows a top view of an air guide member as shown in FIG. 2A.

FIG. 2A shows a perspective view of a first example of an air guide member 10 partly surrounding the protected region 14, and FIG. 2B shows the corresponding top view. In this specific embodiment, the overall shape of the air guide member 10 is an arch portion extending over 180 degrees, and the air deflecting structure 12 circumferentially surrounds the protected region 14.

Figure 3A:
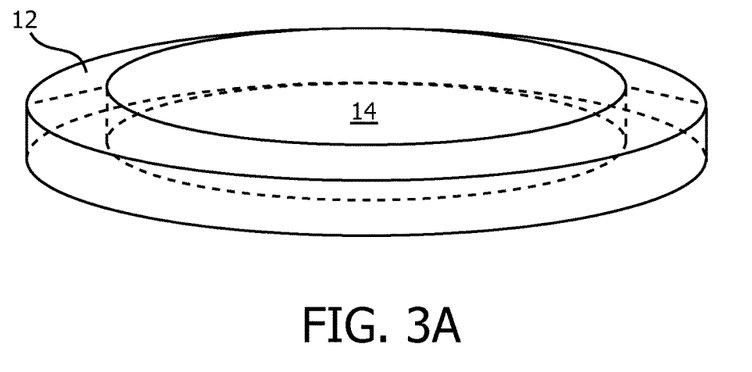
FIG. 3A shows a perspective view of a second example of an air guide member according to the invention.
Figure 3B:
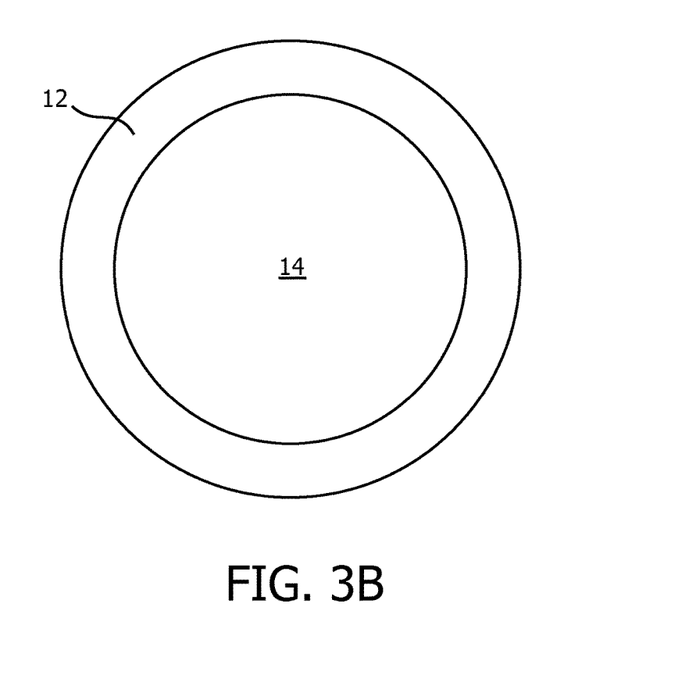
FIG. 3B shows a top view of an air guide member as shown in FIG. 3A.

FIG. 3A shows a perspective view of a second example of an air guide member totally surrounding the protected region 14, and FIG. 3B shows the corresponding top view. In this specific embodiment, the overall shape of the air guide member 10 is a circle, and the air deflecting structure 12 circumferentially surrounds the protected region 14.

It is noted that shapes other than rounded or curved shapes could be used for the air guide member, such as square, triangular, mainly depending on the geometry of the apparatus in which the air guide member is intended to be used.

According to a preferred embodiment, the protected region 14 forms an unobstructed opening. This type of the air guide member is for example illustrated by FIG. 2A, FIG. 2B, FIG. 3A, FIG. 3B. This type of air guide member is intended to be positioned on the bottom surface of the apparatus receiving the air guide member, such that a collection volume is created inside the protected region for receiving the residual material during food preparation. This type of air guide member will be further described in the following.

Figure 4A:
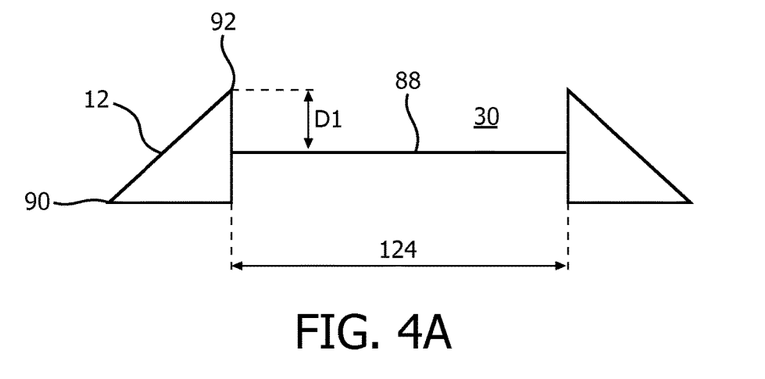
FIG. 4A, FIG. 4B, FIG. 4C show cross-sections of air guide members according to the invention comprising a bottom part.
Figure 4B:
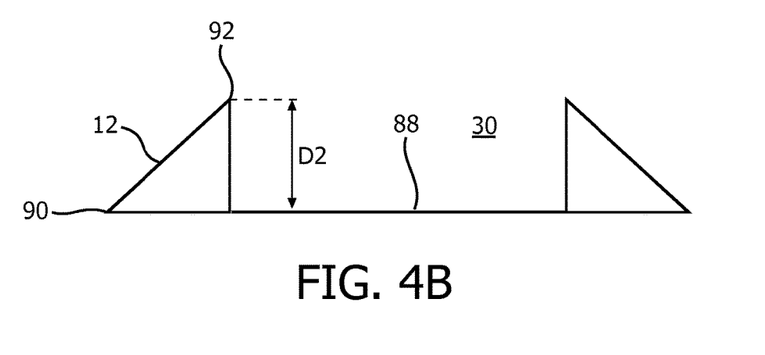
Figure 4C:
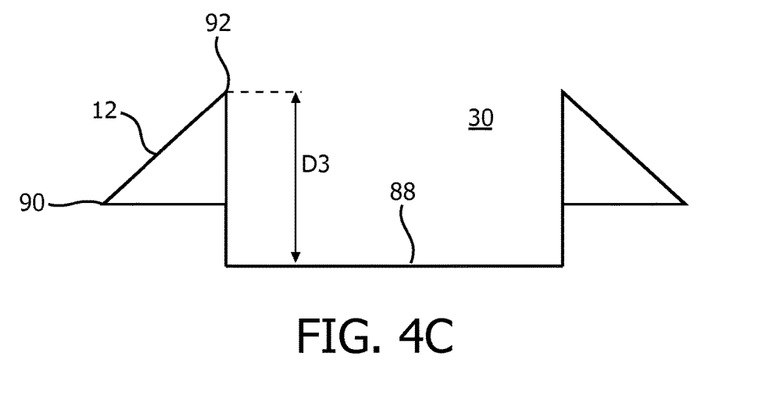

Alternatively, the protected region 14 comprises a bottom surface 88 to close a bottom opening of the protected region 14, as illustrated by FIG. 4A, FIG. 4B and FIG. 4C. By closing a bottom opening of the protected region 14, a collection volume 30 is created inside the protected region for receiving the residual material during food preparation. The bottom surface 88 forms a plain sheet. The bottom surface 88 is made from a heat resistant material, such as, for example, aluminium or stainless steel. Preferably, the bottom surface 88 is made from a low thermal conductivity index material. Preferably, the bottom surface 88 has a thickness less or equal than 1 mm, in order to limit the heat absorption by the bottom surface 88.

The bottom surface 88 is fixed to the adjacent air deflecting structure 12, for example via welding a piece of flat material to the internal lateral sides of the air deflecting structure 12, or via molding the bottom surface 88 together with the air deflecting structure 12. Alternatively, the bottom surface 88 is in contact with the air deflecting structure 12 but detachable from the air deflecting structure 12 as a separate element, and in that case the bottom surface 88 is supported by support elements (not shown) fixed to the internal lateral sides of the air deflecting structure 12.

Preferably, the bottom surface 88 is positioned at different depths D inside the protection region 14, to increase or decrease the volume of the collection volume 30. An increased collection volume 30 helps to reduce the temperature of the bottom surface 88, and thus minimizes the emission of smokes when residual material fall on the bottom surface 88.

FIG. 4A shows an example where the bottom surface 88 is positioned at a depth D=D1 compared to the upper edge level 92 of the air deflecting structure 12, such that the bottom surface 88 is in between a lower edge level 90 of the air deflecting structure 12, and the upper edge level 92 of the air deflecting structure 12.

FIG. 4B shows an example where the bottom surface 88 is positioned at a depth D=D2 compared to the upper edge level 92 of the air deflecting structure 12, such that the bottom surface 88 is aligned with the lower edge level 90.

FIG. 4C shows an example where the bottom surface 88 is positioned at a depth D=D3 compared to the upper edge level 92 of the air deflecting structure 12, such that the bottom surface 88 is below the lower edge level 90.

Preferably, the depth D is a percentage of the width 124 of the protected region 14, preferably in the range [10%; 20%]. For example, the depth D is in the range [20 mm; 40 mm] for a protected region 14 having a width 124 of 200 mm.

Figure 5A:
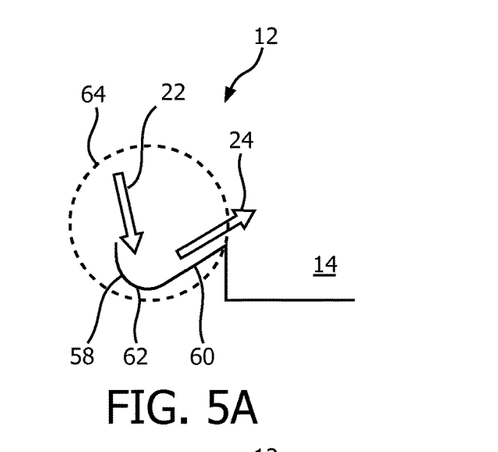
FIG. 5A, FIG. 5B, FIG. 5C show cross-sections of air guide members according to the invention comprising a concave peripheral structure.

According to a preferred embodiment illustrated by FIG. 5A, the deflecting surface structure 12 comprises a peripheral portion 64 (circled in dashed line) forming a concave structure. In this embodiment, the peripheral portion 64 is provided integral with the air deflecting structure 12. The concave structure is formed by a portion 58 extending downwardly, a portion 60 extending upwardly with an orientation leading away from the protected region 14, and a transition portion 62 that connects the portion 58 extending downwardly and the portion 60 extending upwardly.

The portion 58 extending downwardly guides the air flow to the portion 60 extending upwardly via the transition portion 62 while reducing air turbulences, as illustrated by arrows 22 and 24, resulting in a laminar air flow leading away from the protected area 14. Preferably, the transition portion 62 is provided with rounded or curved air guiding surface portions to make a smooth transition between the portion 58 extending downwardly and the portion 60 extending upwardly.

Figure 5B:
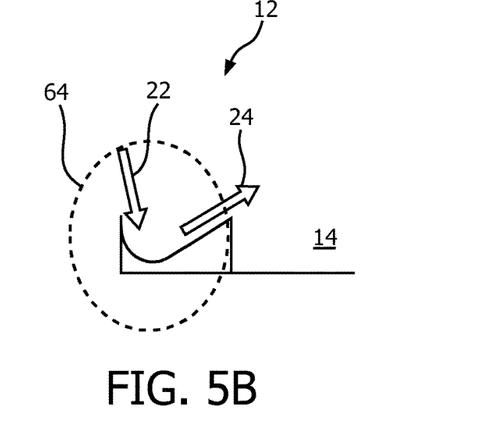
Figure 5C:
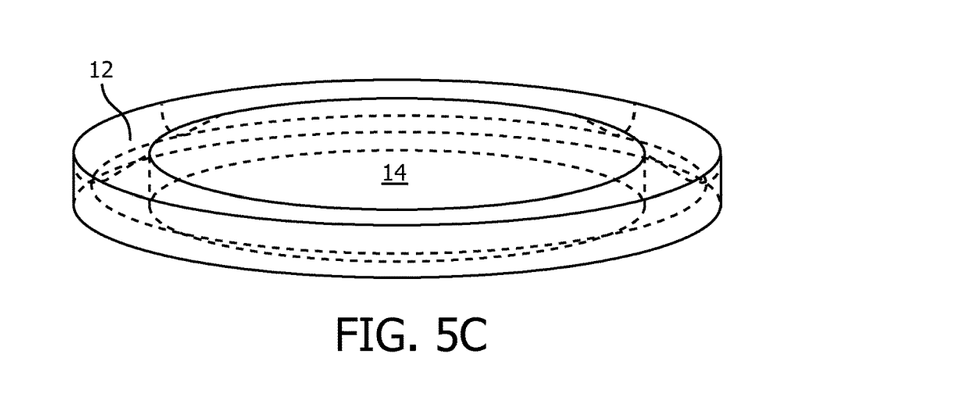

FIG. 5B shows an alternative embodiment where the peripheral portion 64 is formed by a concave groove in the air deflecting structure made of a plain material. An example of a corresponding three-dimensional view is illustrated in FIG. 5C, corresponding to an air guide member having circular shape.

According to a preferred embodiment of the invention, the air guide member comprises a thermal insulation element to limit conductive heat transfer to the protected region 14.

Figure 6A:
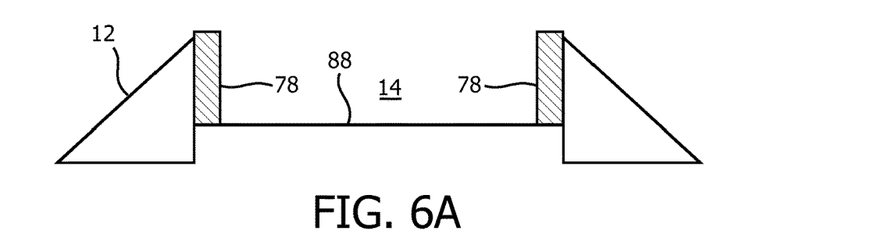
FIG. 6A, FIG. 6B, FIG. 6C, FIG. 6D, FIG. 6E, FIG. 6F show cross-sections of air guide members according to the invention comprising heat insulation elements.

FIG. 6A illustrates an embodiment where a thermal insulation element 78 is placed along the internal side of the air deflecting structure 12. This thermal insulation element 78 limits the heat transfer from the air deflecting structure 12 to the protected region 14. This embodiment is particularly relevant when the bottom surface 88 is placed at a given depth compared to the upper edge level of the air deflecting structure 12, as shown on the perspective view FIG. 6B which depicts an air guide member according to the invention having the insulation element 78 illustrated by a plurality of short vertical segments and the bottom surface 88 illustrated by the oblique hatched area.

Figure 6B:
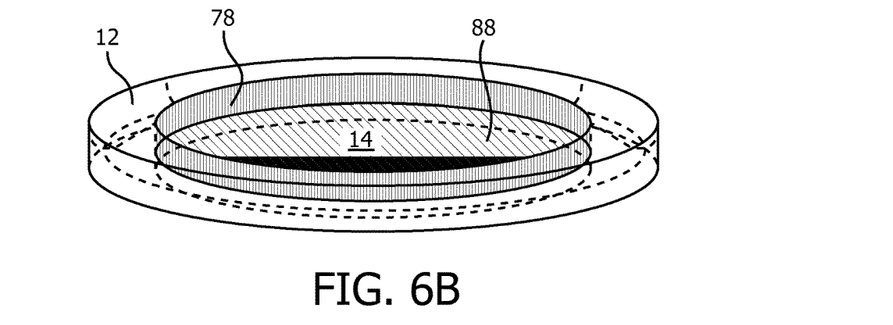
Figure 6C:
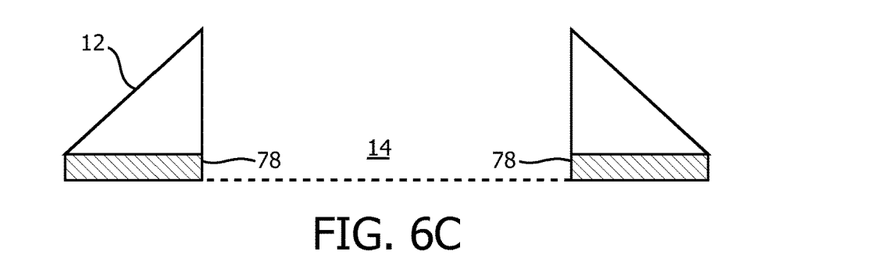
Figure 6D:
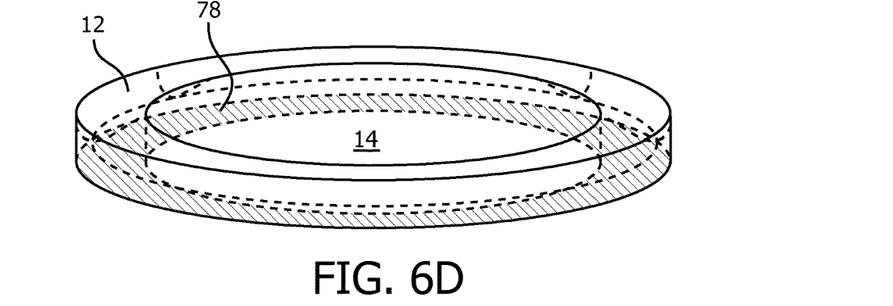

FIG. 6C illustrates an embodiment where a thermal insulation element 78 is placed below the air deflecting structure 12. This embodiment is particularly relevant for an air guide member having a protected region forming an unobstructed opening (illustrated by the horizontal dashed line) that comes into contact with a bottom part of the apparatus for preparing food (further described in the following), also shown on the perspective view FIG. 6D which depicts an air guide member according to the invention having the insulation element 78 illustrated by the oblique hatched area.

Figure 6E:
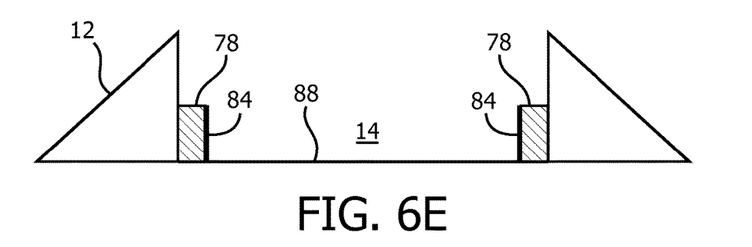
Figure 6F:
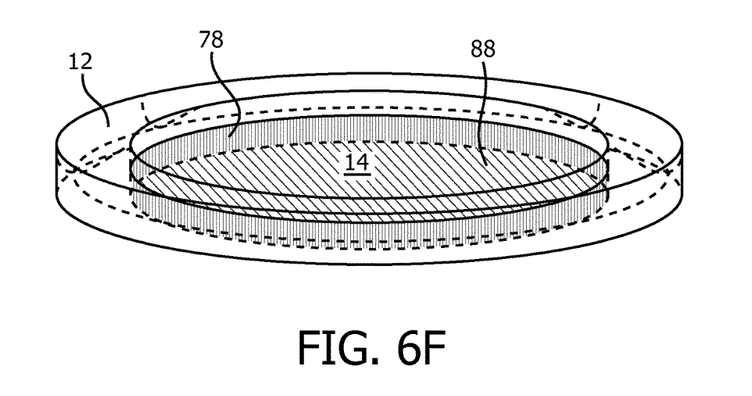

FIG. 6E illustrates an embodiment where a thermal insulation element 78 is placed between the lateral vertical walls 84 connected to a bottom surface 88, and the internal side of the air deflecting structure 12. This embodiment is particularly relevant when the bottom surface 88 (and its lateral vertical walls 84) is detachable from the air deflecting structure 12, as shown on the perspective view FIG. 6F which depicts an air guide member according to the invention having the insulation element 78 illustrated by a plurality of short vertical segments and the bottom surface 88 illustrated by the oblique hatched area.

Preferably, the thermal insulation element 78 is made of silicone gel, or a material having equivalent properties. For example, the thickness of the silicon gel is in the range [1 mm; 3 mm].

Figure 7A:
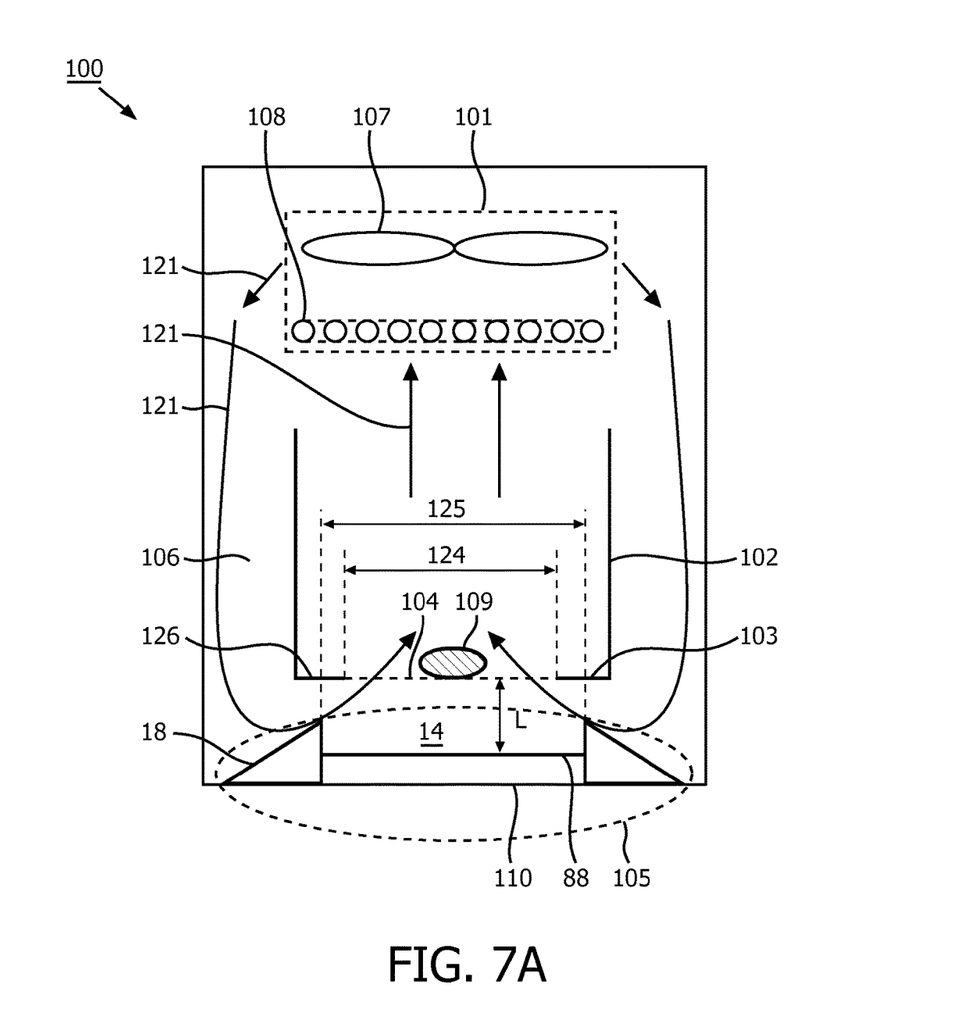
FIG. 7A, FIG. 7B, FIG. 7C, FIG. 7D, FIG. 7E, FIG. 8 show various apparatus according to the invention comprising air guide members according to the invention.

FIG. 7A shows an apparatus 100 according to the invention for preparing food.

The apparatus comprises a system 101 for generating a flow of hot air (illustrated by various arrows 121), a food preparation chamber 102 having a bottom part 103 with a plurality of openings 104 (illustrated by an horizontal dashed segment, for example made of a meshed flat material), an air guide member 105 according to the invention placed below the bottom part 103, air guide means 106 to guide the flow of hot air towards the air guide member 105. The air guide member 105 corresponds to the air guide member previously described according to the invention. For example, the system 101 comprises a fan 107 and a heating element 108. For example, the air guide means 106 correspond to channels or air conduits on the lateral side(s) of the food preparation chamber 102. Food ingredients 109 are intended to be placed on the bottom part 103 with a plurality of openings 104, such that hot air which is circulated inside the apparatus flows towards the food ingredients 109 for cooking, while flowing away from the protected region 14 of the air guide member 105. For example, food ingredient 109 corresponds to chips potatoes, chicken wings, or any other food that can be cooked via hot air. During cooking, if the food ingredients 109 generate residual material when getting heated, such as drops of fat, those residual materials fall on the bottom part 88 of the protected region 14. Because the protected region 14 is kept at a much lower temperature than other parts, oil fumes formation can be prevented or reduced when the residual materials are getting into contact with the bottom part 88. Similarly, in case the protected region 14 does not comprise any bottom part, residual materials fall on the bottom part 110 of apparatus 100. When food is cooked, food is taken out from the apparatus via an opening on the lateral side of the apparatus, for example via a drawer mechanism (not shown).

For example, if the apparatus is intended to domestic usage, a flow of hot air having a rate of 20 l/s can be used, and the temperature of air is preferably in the range [80° C.; 250° C.].

The bottom surface 103 of the food preparation chamber 102 is positioned at a distance L compared to the bottom part 88 of the air guide member 105 (or compared to the bottom part 110 of the apparatus 100 if the air guide member 105 forms an unobstructed opening without any bottom part). Preferably, the distance L is a percentage of the width 125 of the protected region 14, preferably in the range [10%; 20%]. For example, the distance L is in the range [20 mm; 40 mm] for a protected region 14 having a width 125 of 200 mm.

The air guide member 105 can be fixed on the bottom part 110 of the apparatus 100, for example via welding, screws or rivets. Alternatively, the air guide member 105 is placed on the bottom part 110 of apparatus 100 while being freely detachable from the this bottom part 110, which allows users to take the air guide member 105 out from the apparatus for easy cleaning, or for interchanging with another type of air guide member.

Preferably, the plurality of openings 104 of the bottom part 103 defines an area having a width 124 smaller than (or equal to) the width 125 of the protected region 14. This can be done either by having the width of the bottom part 103 smaller than (or equal to) the width 125 of the protected region 14 (not shown), otherwise by placing an additional element 126 at the periphery of the bottom part 103 to limit the width of the plurality of openings 104, as illustrated. In that case, the additional element 126 is for example made of a plain material without any openings.

Figure 7B:
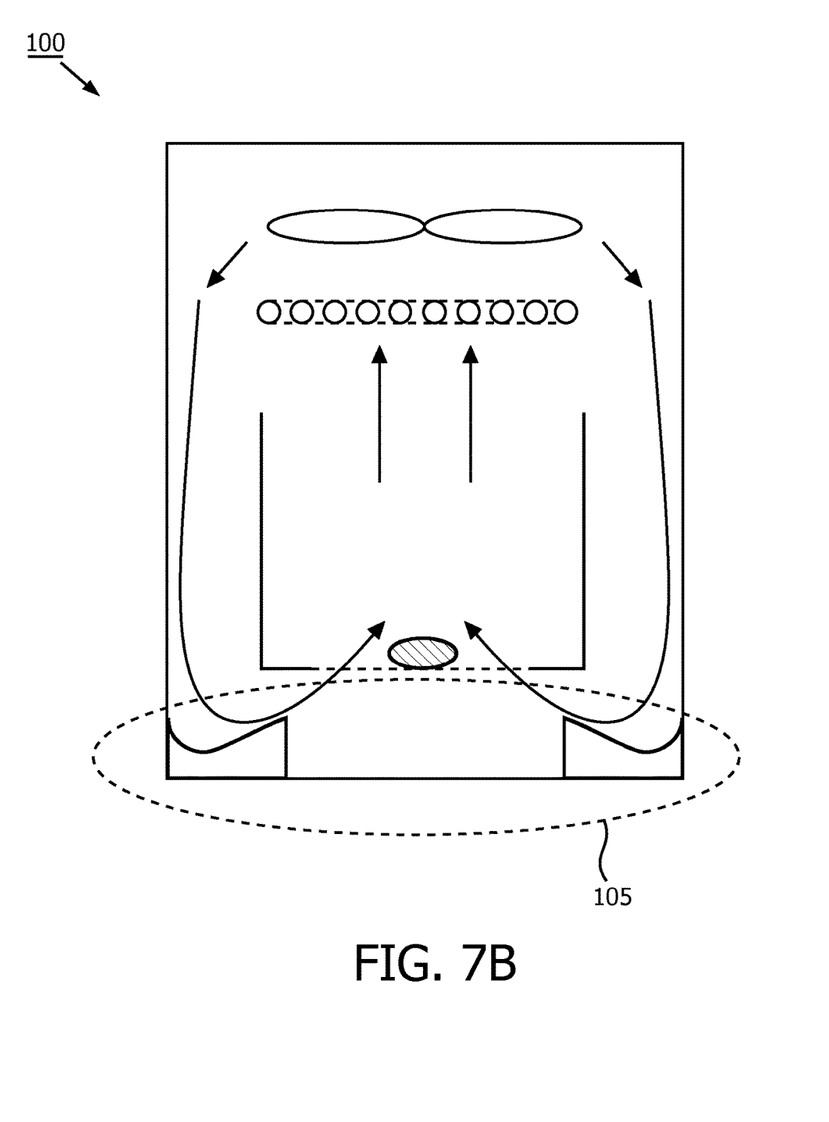

FIG. 7B illustrates an apparatus 100 according to the invention implementing an air guide member 105 as described via FIG. 5C.

Figure 7C:
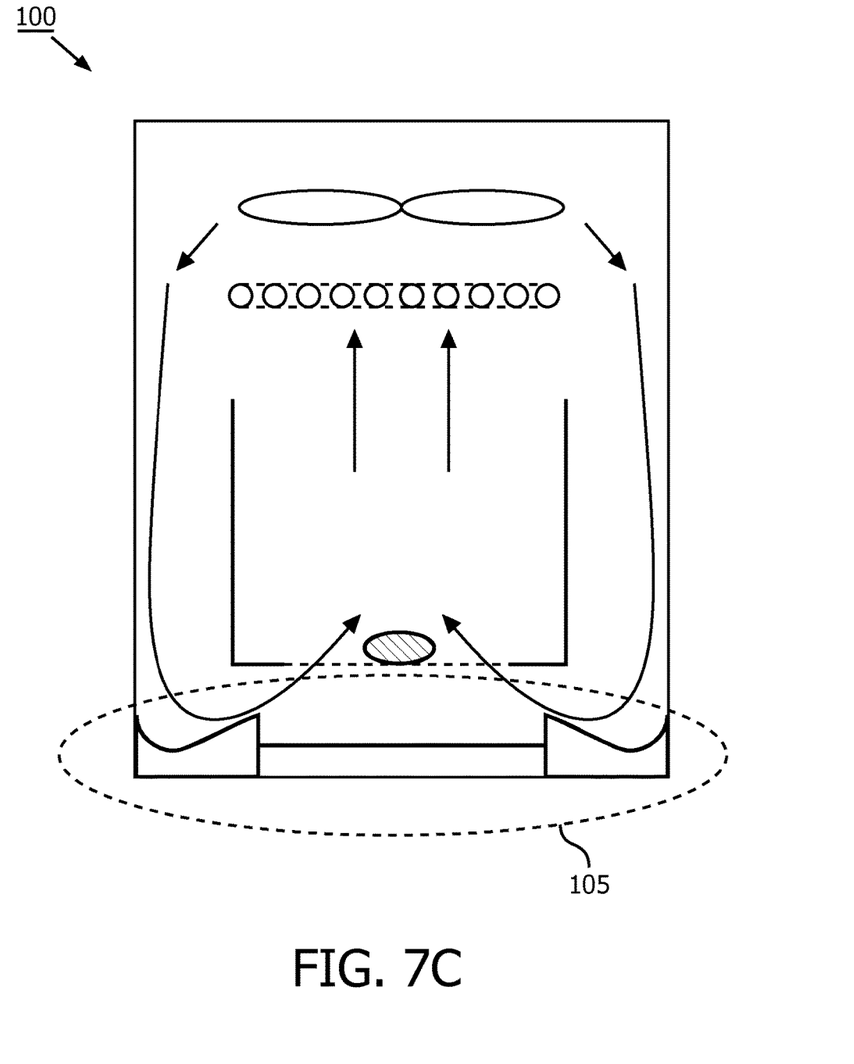

FIG. 7C illustrates an apparatus 100 according to the invention implementing an air guide member 105 as described via FIG. 6B.

Figure 7D:
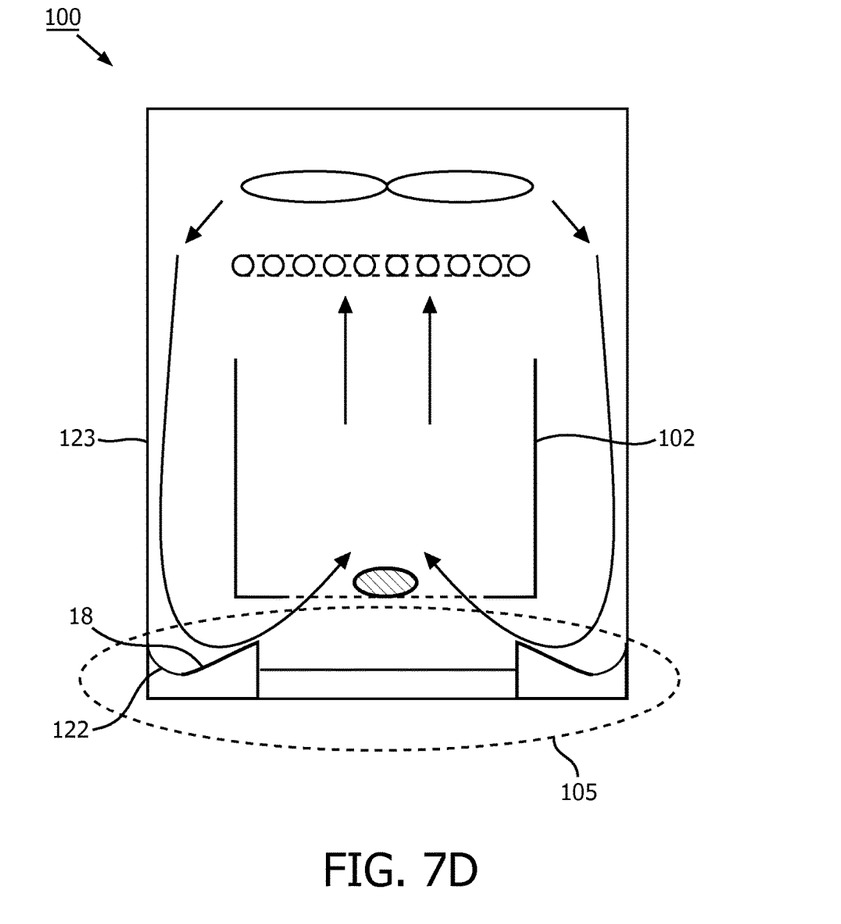

FIG. 7D illustrates an apparatus 100 according to the invention comprising walls 123 enclosing the food preparation chamber 102, and further comprising a concave peripheral portion 122 at the bottom part of walls 123, which abuts the deflection surface 18 of the air guide member 105. This allows extending the surface of the deflection surface 18 while creating an overall concave deflection surface, as described along with FIG. 5A and FIG. 5B.

Figure 7E:
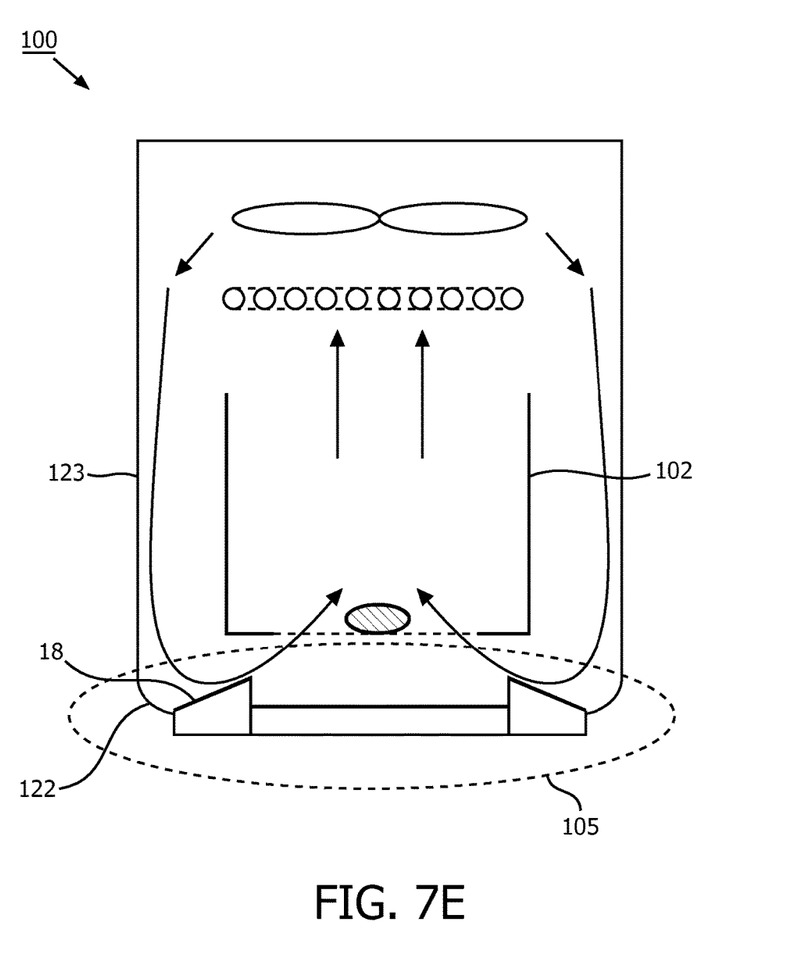

FIG. 7E illustrates an apparatus 100 according to the invention wherein the concave peripheral portion 122 corresponds to a rounded angle of the apparatus. This arrangement is advantageous in case molding of the apparatus walls would already have created this concave peripheral portion 122.

Figure 8:
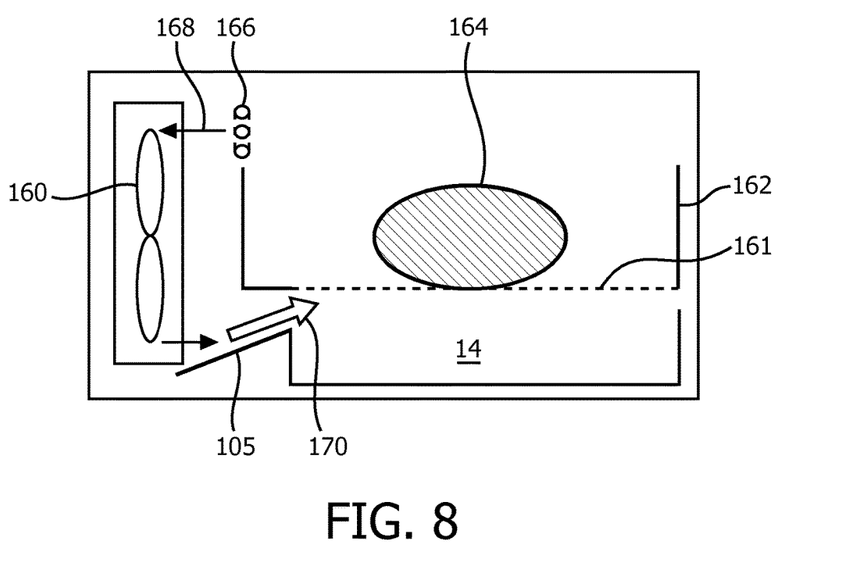

FIG. 8 shows another apparatus according to the invention having a different architecture.

The apparatus comprises a fan 160 is arranged besides a food preparation chamber 162. A heating element 166 is provided. As a result, a flow of hot air 168 is circulated inside the apparatus. The food preparation chamber comprises a bottom part 161 with a plurality of openings, to receive food ingredients 164 to be cooked by the flow of hot air. The air guide member 105 is of the type as described previously, and allows deflecting the stream of hot air above the protected region 14. The protected region 14 is thus arranged outside a main flow direction 170. In this apparatus, the air guide member has overall rectangular shape (or square), and the air guide member is positioned along one side of this rectangular shape.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single element or unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An air guide member for an apparatus for preparing food by circulation of hot air in a food preparation chamber, the air guide member comprising:
   an air deflecting structure; and
   a protected region having a collection volume for collecting residual material from the food preparation chamber,
   wherein the air deflecting structure comprises a peripheral portion forming a concave structure between two side walls, the concave structure including an upwardly slanted deflection surface slanted in a deflection orientation that leads away from the collection volume of the protected region, and a downwardly extending portion connected by a transition portion to the upwardly slanted deflection surface.

2. The air guide member according to claim 1, wherein the air deflecting structure at least partly surrounds the protected region.

3. The air guide member according to claim 2, wherein the air deflecting structure circumferentially surrounds the protected region.

4. The air guide member according to claim 1, wherein the protected region forms an unobstructed opening.

5. The air guide member according to claim 1, wherein the protected region comprises a bottom surface to close a bottom opening of the protected region.

6. The air guide member according to claim 5, wherein the bottom surface is positioned below a lower edge level of the air deflecting structure.

7. The air guide member according to claim 1, wherein the deflection surface has an inclination angle in a range from 0° to 60° in a flow direction compared to a horizontal surface taken as a reference.

8. An air guide member for an apparatus for preparing food by circulation of hot air in a food preparation chamber, the air guide member comprising:
   an air deflecting structure; and
   a protected region for collecting residual material from the food preparation chamber,
   wherein the air deflecting structure has a deflection surface with a deflection orientation that leads away from the protected region, and
   wherein a bottom surface of the protected region is positioned in between a lower edge level of the air deflecting structure, and an upper edge level of the air deflecting structure.

9. An air guide member for an apparatus for preparing food by circulation of hot air in a food preparation chamber, the air guide member comprising:
   an air deflecting structure;
   a protected region for collecting residual material from the food preparation chamber; and
   a thermal insulation element to limit conductive heat transfer to the protected region,
   wherein the air deflecting structure has a deflection surface with a deflection orientation that leads away from the protected region.

10. The air guide member according to claim 9, wherein the thermal insulation element is made of silicone gel.

11. An apparatus for preparing food, comprising:
    a system for generating a flow of hot air;
    a food preparation chamber having a bottom part with a plurality of openings;
    an air guide member placed below said bottom part; and an air channel configured to guide the flow of hot air towards said air guide member, wherein the air guide member includes an air deflecting structure and a protected region having a collection volume for collecting residual material from the food preparation chamber, and wherein the air deflecting structure comprises a peripheral portion forming a concave structure between two side walls, the concave structure including an upwardly slanted deflection surface slanted in a deflection orientation that leads away from the collection volume of the protected region, and a downwardly extending portion connected by a transition portion to the upwardly slanted deflection surface.

12. An apparatus for preparing food, comprising:
a system for generating a flow of hot air;
a food preparation chamber having a bottom part with a plurality of openings;
an air guide member placed below said bottom part; and
an air channel configured to guide the flow of hot air towards said air guide member,
wherein the air guide member includes an air deflecting structure and a protected region for collecting residual material from the food preparation chamber,
wherein the air deflecting structure has a deflection surface with a deflection orientation that leads away from the protected region, and
wherein the plurality of openings defines an area having a width smaller than the width of the protected region.

13. An apparatus for preparing food, comprising:
a system for generating a flow of hot air;
a food preparation chamber having a bottom part with a plurality of openings;
an air guide member placed below said bottom part; and
an air channel configured to guide the flow of hot air towards said air guide member,
wherein the air guide member includes an air deflecting structure and a protected region for collecting residual material from the food preparation chamber,
wherein the air deflecting structure has a deflection surface with a deflection orientation that leads away from the protected region, and
wherein the air guide member is freely detachable from the apparatus.

14. An apparatus for preparing food, comprising:
a system for generating a flow of hot air;
a food preparation chamber having a bottom part with a plurality of openings;
an air guide member placed below said bottom part; and
an air channel configured to guide the flow of hot air towards said air guide member;
walls enclosing the food preparation chamber; and
a concave peripheral portion at a bottom portion of the walls near the bottom part of the food preparation chamber,
wherein the air guide member includes an air deflecting structure and a protected region for collecting residual material from the food preparation chamber,
wherein the air deflecting structure has a deflection surface with a deflection orientation that leads away from the protected region, and
wherein said concave peripheral portion abutting the deflection surface.

* * * * *